Jan. 20, 1959
P. BLEANEY
2,869,843
MECHANICALLY OPERATED SHOVELS OR SCRAPERS
Filed May 27, 1957
2 Sheets-Sheet 1
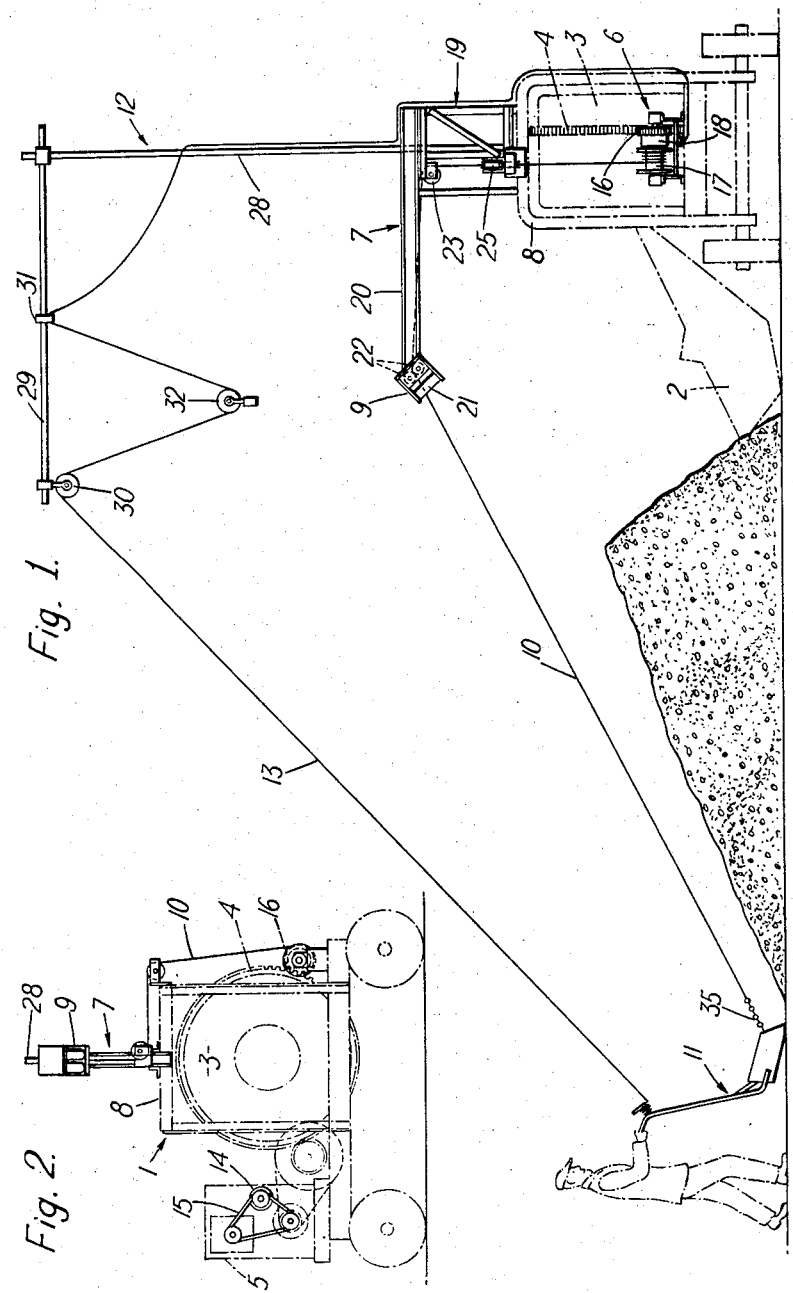
Inventor
Paul Bleaney
By Ralph B. Stewart
Attorney Jan. 20, 1959  P. BLEANEY  2,869,843
MECHANICALLY OPERATED SHOVELS OR SCRAPERS
Filed May 27, 1957  2 Sheets-Sheet 2

Inventor
Paul Bleaney
By Ralph B. Stewart
Attorney

United States Patent Office 2,869,843
Patented Jan. 20, 1959

2,869,843

MECHANICALLY OPERATED SHOVELS OR SCRAPERS

Paul Bleaney, New Addington, England, assignor to A. B. Mould and Construction Company Limited, New Addington, England Application May 27, 1957, Serial No. 661,924

Claims priority, application Great Britain June 1, 1956

6 Claims. (Cl. 259—164)

The present invention concerns improvements in or relating to mechanically operated shovels or scrapers known as hand scrapers of the type in which a scoop or shovel is attached to one end of a cable which is wound on a power operated winch, the scoop or shovel being provided with handles for the operator thereof.

Such mechanically operated scrapers are of use in handling all kinds of bulk material e. g. in building and agriculture. They can be used in the loading and unloading of vehicles. One particular use is the feeding of concrete mixers and the stock piling of sand and aggregates therefor.

Hand scraper units are known in which the cable winch is mounted on a concrete mixer and is driven from the power unit of such mixer through a manually operable clutch also mounted on the mixer. Such units suffer from the disadvantage that since the operator of the mixer has also to operate the clutch this generally means that such operator has to neglect the mixer to operate the clutch or vice versa, whilst the operator of the shovel is idle pending engagement of the clutch.

Hand scraper units which overcome that disadvantage are also known in which the cable winch and clutch therefor together with a power unit is provided as a separate unit, the clutch being controlled from means located on one handle of the scoop. Such separate units are frequently supplied with electric motors and this is frequently inconvenient in that a suitable power supply is not always readily available on a site. Moreover even if such units are provided with an internal combustion engine as the power unit the maintenance and running costs of this additional power unit are appreciable and detract from the saving in labour costs achieved by the use of the unit.

It is an object of the present invention to provide a hand scraper unit which does not suffer from the above disadvantages of known units.

According to the invention there is provided a hand scraper unit comprising a cable winch and clutch assembly adapted to be mounted on a tractor, concrete mixer or other like principal apparatus and to be driven by the power unit thereof, a shovel or scoop and means for operating said clutch controlled remotely by further means mounted on said shovel.

According to a further feature of the invention there is provided a principal apparatus such as a tractor, concrete mixer or the like in combination with a hand scraper unit as set forth above, the winch and clutch assembly being mounted on the principal apparatus to be driven by the power unit thereof.

Said clutch may be any suitable known type of clutch. It may for example be an electromagnetic clutch in which case an electric generator of suitable capacity may be provided which is adapted to be mounted on said tractor, mixer or the like principal apparatus and to be driven by the power unit thereof. In such a case the control means on said scraper or scoop preferably comprises a simple push-button electric switch, although a mechanical control such as a Bowden cable may be provided which operates a switch located on the principal apparatus or cable drum assembly.

Alternatively, the clutch may be of the type which is operated by, for example, fluid under pressure and the control means on said scraper or scoop which means may be electrical or mechanical, serves to control the application of such fluid to the clutch by actuation of a suitable valve.

The cable winch and clutch assembly may be adapted to be driven from the power unit in any convenient way e. g. through meshing gears of the power unit and of the assembly. Thus with one known form of concrete mixer the cable winch and clutch assembly may be provided with a gear which meshes with the drum ring gear of the mixer. Alternatively the cable winch and clutch assembly may be driven from the power unit of the principal apparatus by a belt or chain and sprocket connection.

In one preferred form of the invention the cable winch and clutch assembly is carried by a base plate which may be mounted on a concrete mixer and is provided with a gear wheel adapted to mesh with the drum ring gear of the mixer.

One preferred embodiment of the invention will now be described by way of example with reference to the accompanying drawings in which:

Fig. 1 is a schematic view in elevation of a concrete mixer incorporating a scraper unit according to the present invention;

Fig. 2 is a front elevation of the concrete mixer;

Figure 3:
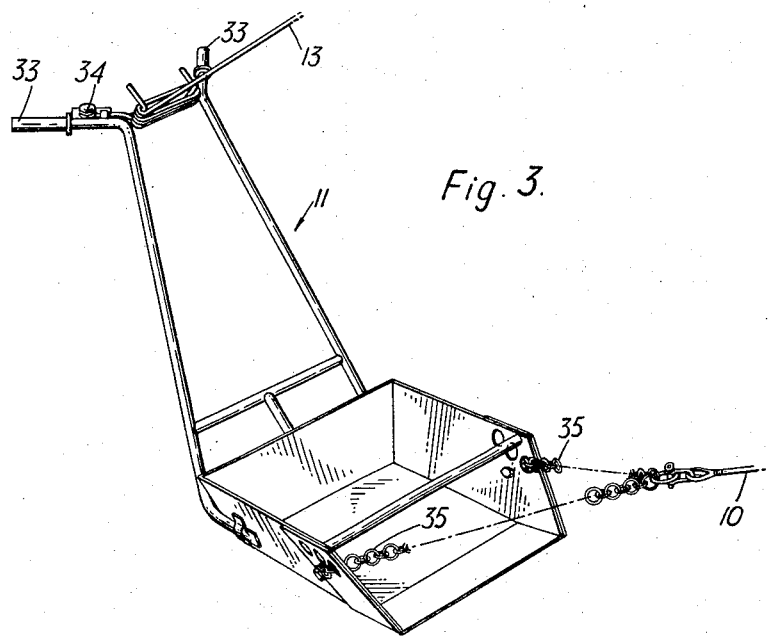
Fig. 3 is a detailed perspective view of a shovel or scoop of the scraper unit.

In the drawings a concrete mixer 1 is shown diagrammatically. The mixer 1 is of the type including a loading hopper 2 (Fig. 1) and a mixer drum 3 incorporating a ring gear 4 through which the drum 3 is driven by the mixer prime mover 5 as indicated in Fig. 2.

The mixer 1 has mounted thereon a winch and clutch assembly 6 driven by the ring gear 4. A jib 7 is mounted in the superstructure 8 of the mixer 1 and includes a fairlead 9 through which a wire cable 10 from the winch assembly is taken to a scoop or shovel 11 to which it is connected. A mast 12 is mounted in the jib 7 and serves to hold out of the way of the shovel 11 an electric cable 13 connected between the shovel 11 and the mixer 1.

As shown in Fig. 1 the winch and clutch assembly is mounted on the side of the mixer 1 and includes a gear wheel 16 which meshes with the ring gear 4 on the mixer drum 3. The winch and clutch of the assembly are indicated by numerals 17, 18 respectively. The clutch 18 is a conventional electro-magnetic clutch and will not, therefore, be described or shown in detail. An electric generator or dynamo 14 (Fig. 2) for energising the clutch 18 is mounted on the mixer and driven from the fan belt 15 of the prime mover 5.

Figure 4:
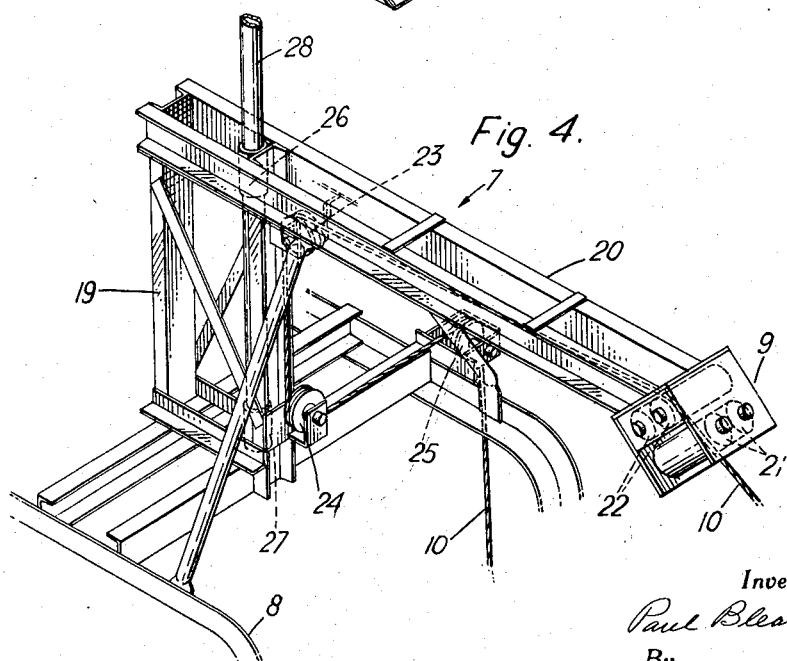
Fig. 4 is a detailed perspective view of a jib mounted on the superstructure of the mixer for guiding a cable to said shovel or scoop.

Referring now to Figs. 1 and 4, the jib 7 comprises a steel structure comprising an upstanding frame 19 mounted in the superstructure 8 of the mixer and carrying a horizontally and forwardly extending composite member 20 on which at its extremity the fairlead 9 is mounted. The fairlead 9 overlies the loading centre of the hopper 2 and comprises four rollers arranged in two pairs 21, 22 between both of which the cable 10 is led. Moreover the axes of the rollers of the pair 21 are at right angles to the axes of the rollers of the other pair 22 so that a smooth lead in for the cable is obtained from all directions.

Pulleys 23, 24, and 25 are provided to guide the cable 10 down to the winch 17.

Tubular holders 26, 27 are provided in the jib 7 (Fig. 1) in which an upright post 28 of the mast 12 is rotatably mounted. A horizontally disposed member 29 of the mast 12 is secured to the upper end of post 28 and carries adjacent its outer end a fixed pulley 30 over which the electric cable 13 passes after which it is looped and secured to the member 29 at 31 before being led down to the mixer. In the looped portion of the cable runs a movable pulley 32 which thus acts as a counterweight and takes up any slack in the cable between the pulley 30 and the shovel 11.

The shape and construction of the shovel 11 is shown in Fig. 3. It is provided with handles 33 for the operator and the cable 13 leads to a push-button switch 34 mounted on one handle in a position convenient for operation whilst the shovel is being guided by the operator.

Chains 35 connect the shovel to the wire cable 10.

Operation of the switch 34 controls the energisation of the clutch 18 which once engaged transmits drive from the ring gear 4 to the winch 17 which causes the wire cable 10 to be wound in thus dragging the shovel 11, guided by the operator, in the direction of the fairlead 9. Since this fairlead overlies the loading centre of the hopper, the shovel is necessarily brought back to the hopper and loading is, therefore, possible over a wide angle of approach.

A second operation of the switch de-energises the clutch 18 and the shovel 11 is then dragged back by the operator prior to starting another loading operation. A continuously-acting brake (not shown), which may be adjustable, is provided on the winch 17 in order to prevent its over-running when being unwound as the operator pulls the shovel back and thus allowing the cable to run free from the pulleys 23, 24, 25.

The post 28 is as mentioned previously, rotatably mounted in the jib 7 and therefore, the mast is enabled to swing in the direction of the shovel. In this way, a greater area of ground may be covered with a given length of cable and this reduces the operator's need to pay out and wind in cable from the shovel.

It will be seen that loading by means of the shovel or scoop can be entirely controlled by the shovel operator as long as the prime mover of the principal apparatus is running so that the shovel operation requires no additional attention apart from that of its operator and avoids the disadvantages above mentioned.

It will be understood that only one preferred embodiment of the invention has been described above by way of example and that variations and modifications may be made therein without departing from the scope of the invention. Thus for example various alternative drive transmission mechanisms may be employed depending on the type of mixer or principal apparatus in use and various alternative mountings for the winch assembly may be provided.

I claim:

1. In combination with a concrete mixer incorporating a power unit, a cable winch and electro-magnetic clutch assembly mounted on said mixer, means drivingly connecting said power unit and said winch through said clutch, a shovel, a cable connecting said shovel to said winch, an electric generator mounted on said mixer for operating said electromagnetic clutch, means drivingly connecting said power unit to said generator, an electric switch mounted upon said shovel, a mast mounted upon said mixer, guide means for an electric cable carried by said mast, an electric cable connecting said switch in circuit with said generator and electro-magnetic clutch so that the switch controls operation of the clutch, said electric cable being led through said guide means carried by the mast and means for taking up slack in said electric cable.

2. The combination as claimed in claim 1 in which the concrete mixer is of the type including a loading hopper and including a jib and a fairlead carried by the jib and disposed above the loading position of the hopper, the cable connecting the shovel and the winch being led through the fairlead.

3. The combination as claimed in claim 1 including a jib secured to the mast and carrying the guide means for said electric cable at the free end, the electric cable being secured to the jib at a point between the guide means and the mast, a counterweight being provided which runs on the electric cable between the point of connection thereof to the jib and the guide means.

4. In combination with a concrete mixer, incorporating a power unit, a cable winch and electro-magnetic clutch assembly mounted on said mixer, means drivingly connecting said power unit and said winch through said clutch, a shovel, a cable connecting said shovel to said winch, an electric generator mounted on said mixer for operating said electromagnetic clutch, means drivingly connecting said power unit to said generator, an electric switch mounted upon said shovel, a mast mounted upon said mixer, a jib carried by said mast and mounted for swinging movement about the axis of the mast, cable guide means carried by said jib, an electric cable connecting said switch in circuit with said generator and electro-magnetic clutch, said electric cable being led through the guide means, and means for taking up slack in said electric cable.

5. The combination as claimed in claim 4 in which the guide means is a pulley mounted at the end of the jib, the electric cable being fixedly connected to the jib between the guide pulley and the mast, said take-up means being constituted by a counterweight pulley running on said electric cable between the guide pulley and the said point of connection of the cable to the jib.

6. In combination with a concrete mixer including a power unit and a loading hopper, a cable winch and clutch assembly mounted on said mixer, means drivingly connecting said power unit and said winch through said clutch, a shovel, a cable connecting said shovel to said winch, clutch operating means, control means mounted upon said shovel, cable means operatively connecting said control means and said clutch operating means, said control means being adapted to control operation of the said clutch operating means, a mast mounted upon said mixer, guide means carried by said mast through which said cable means passes, means for taking up slack in said cable means, a jib and a fairlead carried by the jib and disposed above the loading position of the hopper, the cable connecting the shovel and the winch being led through the fairlead.

References Cited in the file of this patent

UNITED STATES PATENTS 681,941     Westbrook _____ Sept. 3, 1901

FOREIGN PATENTS 450,696     Great Britain _____ July 23, 1936